3,320,071
PROCESS FOR PRODUCING ISOHUMULON-RICH HOPS EXTRACTS
Adam Muller, Coburg, Germany, assignor to Chemisches Laboratorium Dr. A. Muller, Coburg, Germany, a corporation of Germany
No Drawing. Filed Jan. 22, 1964, Ser. No. 339,321
8 Claims. (Cl. 99—50.5)

The invention relates to novel hops extracts which have a variable ratio of bitter substances to tanning substances between 1:0.1 to 1:1.75 and which contain certain amounts of $\alpha$- and $\beta$-acids. The invention also relates to a novel process for the preparation of the said hops extracts.

Various processes are known for preparing hops extracts outside the brewery without beer wort which is the usual extraction agent used in breweries. These hops extracts usually have a syrup-like consistency and contain the bitter substances or essences (extract soluble in organic solvents) and the tanning substances (extract soluble in water or aqueous solvents) of the hops in concentrated form.

Hops have been extracted in two stages with first organic solvents and then with water having a German hardness of less than 5° (usual brewing water required for good, light beers) and the quantitative ratios of bitter substances to tanning substances may be varied from 1:0.1 to 1:2.5. These hops extracts have the advantage over the extraction of raw hops in being able to vary the ratio of the bitter substances to the tanning substances and in the more rapid transformation of the $\alpha$- and $\beta$-acids which are insoluble in the wort and beer into iso-$\alpha$- and iso-$\beta$-acids which are soluble in the wort and beer during boiling of the hops. However, the extracts of these processes contain only very small amounts of iso-$\alpha$- and iso-$\beta$-acids which corresponds to the amounts originally present in the raw hops.

Hops have also been extracted with boiling alkalinized beer wort and the hops extract is then added in liquid or pulverized form to the boiling wort. However, the ratio of bitter substances to tanning substances is the same as in the raw hops which is usually about 1:2.5. When the said ratio is 1:1.8 and higher and the extract is prepared in an alkaline medium, the hops extracts impart an unpleasant bitter aftertaste and a strong reddish color to the beer, reduce the foaming properties of the beer, etc.

In applicant's copending United States application Serial No. 120,965 filed June 30, 1961 now United States Patent No. 3,143,425, there are described hops extracts formed by extracting hops with organic solvents containing 10 to 40% of ammonia water wherein the ratio of the bitter substances to the tanning substances is below 1:1.75. This process, however, converts all the $\alpha$-acids to iso-$\alpha$-acids during the extraction which has the advantage of substantially reducing the period of boiling of the hops in the brewhouse.

Breweries, however, are reluctant to change their traditional procedures which includes hop boiling periods of 1.5 to 2 hours. When the hops extracts in which all the $\alpha$-acids have been converted to iso-$\alpha$-acids are used in the traditional fashion, the hops extracts are partially cleaved into humulinic acid, hexenic acid, acetic acid and isobutyraldehyde which do not have the proper bittering effect during boiling of the wort.

It is an object of the invention to provide novel hops extracts which have a desirable ratio of bitter substances to tanning substances and which contain $\alpha$- and $\beta$-acids and iso-$\alpha$- and iso-$\beta$-acids.

It is another object of the invention to provide a novel process for the preparation of hops extracts.

These and other objects and advantages of the invention will become obvious from the following detailed description.

The novel hops extracts of the invention have a ratio of bitter substances to tanning substances varying from 1:0.1 to 1:1.75 and contain 12 to 60% of iso-compounds based on the dry weight of the total resin. These hops extracts do not have the disadvantages of the known hops extracts and achieve an optimum utilization of the bitter substances even during the traditional period of boiling of the hops. The degradation of the iso-humulon containing hops extracts during boiling of the wort will not occur as long as $\alpha$-acids are present in the hops extracts.

The term iso-$\alpha$-acids as used herein means the total of iso-humulon, iso-cohumulon, iso-adhumulon, iso-prehumulon and iso-posthumulon and the term iso-compounds means the total of the isomers of $\alpha$-acids, $\beta$-acids (lupulons), $\gamma$-acids (humulinons) and $\Delta$-acids (hulupons).

The process of the invention for the preparation of hops extracts comprises extracting raw hops with an organic solvent at least slightly soluble in water containing 1 to 60% hard water to extract the bitter substances from the hops, then extracting the said hops with hot hard water to extract the tanning substances from the hops, concentrating the said extracts separately to a water content of about 10 to 20% based on the dried extract and mixing the two extracts in the presence of air to obtain a hops extract having a ratio of bitter substances to tanning substances of about 1:0.1 to 1:1.75 and having only a partial isomerization of the total resins to iso-compounds.

The second extraction of the hops with hard water partially converts the $\alpha$-acids to iso-$\alpha$-acids and the mixing of the two concentrated extracts in the presence of air partially converts the $\beta$-acids to iso-$\beta$-acids. The hops extracts contain 6 to 30% of iso-$\alpha$-acids and 5 to 25% of iso-$\beta$-acids based on the dried total resin weight.

The organic solvents used for the first extraction step must be at least slightly soluble in water or the iso-compounds present in the original hops would migrate into the hard water extract and would be lost in the preparation of hops extracts having a bitter substance-tanning substance ratio near 1:0.0 since little of the hard water extract is needed for hops extracts with the said ratio. Examples of suitable organic solvents are alkyl ethers such as diethyl ether with a hard water content of 1 to 60%, halogenated hydrocarbons such as dichloromethane with a hard water content of 1 to 2%, alkanols such as methanol with a hard water content of 1 to 6%, etc. and mixtures thereof. Water-immiscible solvents e.g. n-hexane and petroleum ether must not be used since they contain far less water in solution than dichloromethane or diethyl ether and since a bitter substance-tanning substance ratio of 1:0.0 is obtained with these solvents.

The term hard water as used herein means water having a high total hardness and a high residual alkalinity which water is unsuitable for brewing purposes because of its high carbonate hardness. The said hard water does not affect the final beer since the amount of hard water in the hops extracts represents only 0.003 to 0.005% of the water in the wort and cannot be analytically detected in the wort. The hard water may have a total German hardness of 12° (120 p.p.m. calculated as calcium carbonate) or higher and a residual alkalinity of at least 8° German hardness. Water whose pH has been adjusted to 7.9 with basic ion exchange resins is also suitable.

Residual alkalinity is equal to the total hardness less the equalized alkalinity of the water. For example, if the water has a total German carbonate hardness of 16.5° and contains 172 mg. of CaO per liter and 55 mg. of MgO per liter, its German lime hardness is 172÷10 or 17.2° and its German magnesia hardness is $(55 \times 1.4)/10$ or 7.7°. Its lime value is therefore $17.2° + (7.7°/2)$ or 21.05° and its equalized alkalinity which is the lime value divided by 3.5 is 6.0. Therefore, the residual alkalinity of the water is 16.5° less 6.0° or 10.5° German hardness.

The mixing of the concentrated organic solvent and hard water extracts may be accomplished by the slow addition of either extract to the other with constant stirring at temperatures of 45 to 70° C., preferably about 60° C. For example, the mixing may be carried out over a period of about one hour if the peripheral angular velocity of the stirrer blades is about 0.3 to 3 meters per second. In stirring vessels with horizontally extending axes, the said extracts are brought in good contact with the column of air above the mixture in a thin layer adjacent to the blades of the stirrer if the stirring vessel is filled only to about the axis of rotation. The speed of rotation is adjusted so that sufficient contact of the air and the admixture of the extracts takes place. During the mixing, very minor amounts of the solvent present in the bitter substance extract are removed so that the final hops extract has an average water content of about 10%.

In the following examples there are described several preferred embodiments to illustrate the invention. However, it should be understood that the invention is not intended to be limited to the specific embodiments.

so that the final hops concentrate had a ratio of bitter substance to tanning substance of 1:0.5.

The water used in the aqueous extraction step and in the organic solvent-water mixture had a total German hardness of 16.9° at a pH of 7.3 and a residual alkalinity of 10.6 German hardness.

*Example II*

A hops extract was prepared according to the procedure of Example I with the exception that the ratios of bitter substances to tanning substances was 1:1.5.

*Example III*

A hops extract was prepared according to the procedure of Example I except that the water used in the aqueous extraction and in the organic solvent-water mixture was normal brewing water having a total German hardness of 8.0° with a pH value of 6.75 and a residual alkalinity of 2.1° German hardness.

*Example IV*

A hops extract was prepared according to the procedure of Example III except that the pH of the water was adjusted to 7.9 with a basic ion exchanger.

In order to demonstrate the differences between the hop extracts according to the invention (Examples I, II and IV) and extracts using soft water (Example III), extracts from raw hops and extracts prepared according to the process of application Serial No. 120,965, the said extracts were analyzed for their iso-$\alpha$- and iso-$\beta$-acids and $\alpha$- and $\beta$-acids. The results are summarized in Table I.

TABLE I

| | | Raw Hops I | Raw Hops II | Hops Extract Ex. I | Hops Extract Ex. II | Hops Extract Ex. III | Hops Extract Ex. IV | Hops Extract Application No. 120,965 |
|---|---|---|---|---|---|---|---|---|
| Total Resins | Percent | 100.0 | 100.0 | 100.0 | 100.0 | 100.0 | 100.0 | 100.0 |
| | gm | 15.2 | 17.3 | 64.9 | 40.2 | 64.8 | 64.9 | 62.0 |
| Soft Resins | Percent | 91.5 | 90.2 | 85.5 | 86.5 | 87.5 | 84.5 | 91.0 |
| | gm | 13.9 | 15.6 | 54.6 | 34.7 | 56.7 | 54.6 | 56.4 |
| $\alpha$-acid | Percent | 36.2 | 36.4 | 25.5 | 22.1 | 33.5 | 12.0 | 0.0 |
| | gm | 5.5 | 6.3 | 7.8 | 8.9 | 21.7 | 7.8 | 0.0 |
| iso-$\alpha$-acids | Percent | 2.24 | 2.6 | 10.5 | 15.4 | 2.78 | 24.0 | 40.6 |
| | gm | 0.34 | 0.45 | 15.5 | 6.2 | 1.80 | 15.5 | 25.2 |
| $\beta$-acids | Percent | 40.7 | 34.6 | 31.6 | 19.9 | 37.3 | 19.7 | 8.9 |
| | gm | 6.2 | 6.0 | 12.8 | 8.0 | 24.2 | 12.8 | 5.5 |
| iso-$\beta$-acids | Percent | 1.97 | 2.77 | 8.2 | 21.6 | 2.50 | 19.5 | 31.6 |
| | gm | 0.30 | 0.48 | 12.7 | 8.7 | 1.62 | 12.7 | 19.6 |
| Hard Resins | Percent | 8.5 | 9.8 | 14.5 | 13.5 | 12.5 | 15.5 | 9.0 |
| | gm | 1.3 | 1.7 | 10.3 | 5.5 | 8.1 | 10.3 | 5.6 |

*Example I*

1 kg. of comminuted commercial Hallertauer hops (1962 harvest) was extracted with 20 kg. of water-saturated dichloromethane containing about 2% water while stirring. The water-saturated solvent was replaced several times. The said organic extracts which contained the bitter substances were combined and filtered to remove spent hop grains. The hop residues were washed with a spray-stream to remove residual solvent and bitter substances and the wash was combined with the extracts.

The spent hop grains were boiled for about 15 minutes with hard water to extract the tanning substances therefrom. The aqueous extract was then filtered to separate the spent hop grains and was then concentrated in vacuo to a water content of about 10% based on the dried extract.

The organic extract containing the bitter substances was concentrated in vacuo to a water content of about 10% based on the dried extract. The density of both the bitter substance extract and the tanning substance extract was determined with an airometer and the two extracts were mixed in a stirring vessel with horizontal axes under a column of air to admix a thin layer of the extracts with the air. The mixing was performed at 60° C. and took about one hour. The extracts were admixed The raw hops I were commercial Hallertauer hops of the 1962 harvest and are the same hops used to prepare hops extracts I to V. Raw hops II were Hallertauer breed hops of the 1962 harvest. The raw hops I and II had a ratio of bitter substances to tanning substances of 1:2.5. The hops extracts of the invention have a greater amount of the $\alpha$- and $\beta$-acids converted to the iso-$\alpha$- and iso-$\beta$-acids than hops extracts III and did not convert all the $\alpha$-acids to iso-$\alpha$-acids as with hops extracts V.

To demonstrate the better bitter substance utilization of the hops extracts of the invention, boiling wort tests were made with raw hops I and hop extracts I to V. The hopped worts were always innoculated with the same brewing yeast (strain VIIb), fermented for 12 days at room temperature and the new beers were examined in the same method as the worts.

The wort boiling tests were performed at an identical extract content of 12.2 gm. per 100 ml. in portions of 3 liters each for two hours. The hop boiling period was two hours in all tests. The water evaporated was replaced with hot water during the boiling and at the end of the boiling it was returned exactly to its original value by weight. The addition of the hops and hops extract (0.835 gm. dried total resins per 3 liters of wort) was effected on the basis of their total-resin content so that the amounts of bitter substances was always the same. The results of the wort boiling tests are in Table II and the results of tests on the beers prepared from the said worts are in Table III.

TABLE II
[Wort boiling tests]

|  | Raw Hops I | Hops Extract Ex. I | Hops Extract Ex. II | Hops Extract Ex. III | Hops Extract Ex. IV | Hop Extract Application No. 120,965 |
|---|---|---|---|---|---|---|
| Bitter Substance according to Klopper Analysis, mg./l | 56.2 | 66.9 | 68.9 | 60.5 | 68.4 | 65.4 |
| Percent Savings in Hops | 0 | 16.0 | 18.5 | 7.0 | 18.0 | 14.0 |

TABLE III
[Raw beer analysis]

|  | Raw Hops I | Hops Extract Ex. I | Hops Extract Ex. II | Hops Extract Ex. III | Hops Extract Ex. IV | Hop Extract Application No. 120,965 |
|---|---|---|---|---|---|---|
| Bitter substance according to Klopper Analysis, mg./l | 37.1 | 47.5 | 49.4 | 41.5 | 49.2 | 45.6 |
| Percent Savings | 0 | 22.0 | 25.0 | 10.5 | 24.5 | 19.5 |

The wort boiling tests and new beer tests clearly show that the hops extracts of the invention result in a greater bitter substance utilization which results in a saving in the amount of hops required than hops extracts (Ex. III) with only a minor amount of iso-α and iso-β-acids. In addition, the hops extracts of the invention have a higher bitter substance content after two hours of boiling than the hops extract in which all the α-acids have been converted to iso-α-acids.

Various modifications of the process of the invention may be made without departing from the spirit or scope thereof, and it is to be understood that the invention is to be limited only as defined in the appended claims.

I claim:
1. A process for the preparation of hops extracts which compriss extracting raw hops with an organic solvent at least slightly soluble in water and selected from the group consisting of alkyl ethers and alkanols with a water content of 1 to 6% and halogenated hydrocarbons having a water content of 1 to 2% and mixtures thereof to extract the bitter substances from the hops, then extracting the said hops with hot water to extract the tanning substances from the said hops, concentrating the said extracts separately to a water content of 10 to 20% based on the dried extract and mixing the two extracts in the presence of air at temperatures of about 45 to 70° C. in proportions to obtain a hops extract having a ratio of bitter substances to tanning substances of 1:0.1 to 1:1.75, said water having a total German hardness of at least 12° and a residual German alkalinity of at least 8°.

2. A process for the preparation of hops extracts which comprises extracting raw hops with an organic solvent at least slightly soluble in water and selected from the group consisting of alkyl ethers and alkanols with a water content of 1 to 6% and halogenated hydrocarbons having a water content of 1 to 2% and mixtures thereof to extract the bitter substances from the hops, then extracting the said hops with hot water to extract the tanning substances from the said hops, concentrating the said extracts separately to a water content of 10 to 20% based on the dried extract and mixing the two extracts in the presence of air at temperatures of about 45 to 70° C. in proportions to tanning substances of 1:0.1 to 1:1.75 said water having its pH adjusted to about 7.9 with a basic ion exchanger.

3. A process for the preparation of a hops extract having a ratio of bitter substances to tanning substances of 1:0.1 to 1:1.75 and containing 12 to 60% of iso-compounds based on the dry weight of total resins which comprises extracting hops with an organic solvent at least slightly soluble in water and selected from the group consisting of diethyl ether and methanol containing 1 to 6% water and dichloromethane containing 1 to 2% of water and mixtures thereof, said water having a total German hardness of at least 12° and a residual German alkalinity of at least 8° to extract the bitter substances from the hops, then extracting the said hops with hot water having a total German hardness of at least 12° and a residual German alkalinity of at least 8° to extract tanning substances from the hops and to partially convert the α-acids to iso-α-acids, separately concentrating the said extracts to a water content of about 10 to 20% based on the dried extract and mixing thin layers of the said extracts in the presence of air to obtain a hops extract having a ratio of bitter substances to tanning substances of about 1:0.1 to 1:1.75 and having only a portion of the total resins isomerized to iso-compounds.

4. The process of claim 1 wherein the organic solvent is an alkyl ether containing 1 to 6% of hard water.

5. The process of claim 1 wherein the organic solvent is a halogenated hydrocarbon containing 1 to 2% of hard water.

6. The process of claim 1 wherein the organic solvent is an alkanol containing 1 to 6% of hard water.

7. The process of claim 5 wherein the two extracts are mixed at temperatures of 45 to 75° C.

8. The process of claim 3 wherein the organic solvent is dichloromethane containing about 2% of hard water.

References Cited by the Examiner
UNITED STATES PATENTS

| 46,973 | 3/1865 | Percy et al. | 99—50.5 |
| 2,898,209 | 8/1959 | Murtaugh et al. | 99—50.5 |

A. LOUIS MONACELL, *Primary Examiner.*

D. M. STEPHENS, *Assistant Examiner.*